(12) United States Patent
Suzuki et al.

(10) Patent No.: US 8,996,422 B2
(45) Date of Patent: Mar. 31, 2015

(54) SUBSTRATE PROCESSING SYSTEM, METHOD OF CONFIRMATION OF ITS STATE OF USE, AND METHOD OF PREVENTION OF ILLICIT USE

(75) Inventors: Hiroyuki Suzuki, Tokyo (JP); Shinichi Okita, Tokyo (JP); Tadashi Yamaguchi, Yokohama (JP)

(73) Assignees: Nikon Corporation, Tokyo (JP); Nikon Systems Inc., Tokyo (JP)

( * ) Notice: Subject to any disclaimer, the term of this patent is extended or adjusted under 35 U.S.C. 154(b) by 1258 days.

(21) Appl. No.: 11/659,878

(22) PCT Filed: Aug. 10, 2005

(86) PCT No.: PCT/JP2005/014685
§ 371 (c)(1),
(2), (4) Date: Jul. 18, 2007

(87) PCT Pub. No.: WO2006/016619
PCT Pub. Date: Feb. 16, 2006

(65) Prior Publication Data
US 2007/0272151 A1 Nov. 29, 2007

(30) Foreign Application Priority Data
Aug. 12, 2004 (JP) ................................. 2004-235216

(51) Int. Cl.
*G06F 21/00* (2013.01)
*G06Q 30/06* (2012.01)
(Continued)

(52) U.S. Cl.
CPC ............ *G06Q 30/06* (2013.01); *G06Q 2220/18* (2013.01); *G06F 2221/2113* (2013.01);
(Continued)

(58) Field of Classification Search
USPC ............................................ 705/59; 118/695
See application file for complete search history.

(56) References Cited

U.S. PATENT DOCUMENTS 4,783,307 A * 11/1988 Galligan et al. .............. 376/217
5,406,261 A   4/1995 Glenn
(Continued)

FOREIGN PATENT DOCUMENTS

| EP | 1 378 810 A3 | 1/2004 |
| JP | A 11-161486 | 6/1999 |

(Continued)

OTHER PUBLICATIONS

Dec. 20, 2013 Extended European Search Report issued in European Patent Application No. 13185393.9.
(Continued)

*Primary Examiner* — Steven Kim
(74) *Attorney, Agent, or Firm* — Oliff PLC

(57) ABSTRACT

[PROBLEM] To enable confirmation of whether a substrate processing system is being illicitly used and preventing that use when there is the fact of illicit use.
[MEANS FOR SOLUTION] A license file LF is a file encrypting license information L including usage terms of a substrate processing system for a specific user. A match confirmation program P2 confirms the match between the content of the license file LF decrypted by a decryption program P1 and device information DI, network information NI, and current time CT obtained from the substrate processing system to confirm the existence of the fact of illicit use. If there is illicit use, the control program P3 stops operation of the substrate processing system until predetermined action is taken based on the information from the match confirmation program P2.

21 Claims, 8 Drawing Sheets

(51) Int. Cl.
  *G03F 7/20* (2006.01)
  *G06F 21/71* (2013.01)
  *G06Q 10/10* (2012.01)
  *H01L 21/67* (2006.01)

(52) U.S. Cl.
  CPC ........ *G03F 7/70425* (2013.01); *G03F 7/70508* (2013.01); *G06F 21/71* (2013.01); *G06F 2221/2105* (2013.01); *G06F 2221/2137* (2013.01); *G06F 2221/2149* (2013.01); *G06Q 10/10* (2013.01); *H01L 21/67253* (2013.01); *H01L 21/67294* (2013.01)
  USPC ............................................ 705/59; 118/695

(56) References Cited

U.S. PATENT DOCUMENTS

| | | | | |
|---|---|---|---|---|
| 5,796,941 | A * | 8/1998 | Lita | 726/29 |
| 5,892,900 | A * | 4/1999 | Ginter et al. | 726/26 |
| 6,125,446 | A | 9/2000 | Olarig et al. | |
| 6,326,597 | B1 * | 12/2001 | Lubomirsky et al. | 219/494 |
| 6,614,050 | B1 * | 9/2003 | Yamada et al. | 257/48 |
| 6,615,192 | B1 * | 9/2003 | Tagawa et al. | 705/57 |
| 6,618,810 | B1 | 9/2003 | Dirie | |
| 6,826,441 | B2 * | 11/2004 | Yamagishi | 700/121 |
| 6,862,486 | B2 * | 3/2005 | Cocco et al. | 700/95 |
| 6,937,917 | B2 * | 8/2005 | Akiyama et al. | 700/121 |
| 7,047,100 | B2 * | 5/2006 | Kitamoto et al. | 700/121 |
| 7,524,378 | B2 * | 4/2009 | Mori | 118/708 |
| 7,610,113 | B2 * | 10/2009 | Cocciadiferro et al. | 700/108 |
| 2002/0091645 | A1 | 7/2002 | Tohyama | |
| 2003/0009253 | A1 * | 1/2003 | McIntyre et al. | 700/108 |
| 2003/0015290 | A1 * | 1/2003 | Edo | 156/345.27 |
| 2003/0110011 | A1 * | 6/2003 | Kyotoku | 702/186 |
| 2004/0003279 | A1 * | 1/2004 | Beilinson et al. | 713/200 |
| 2004/0122545 | A1 | 6/2004 | Akiyama et al. | |
| 2006/0090703 | A1 * | 5/2006 | Kaise et al. | 118/719 |

FOREIGN PATENT DOCUMENTS

| | | |
|---|---|---|
| JP | A 2001-265581 | 9/2001 |
| JP | A 2001-282526 | 10/2001 |
| JP | A 2002-091922 | 3/2002 |
| JP | A 2002-189590 | 7/2002 |
| JP | A 2002-251225 | 9/2002 |
| JP | A 2004-038247 | 2/2004 |
| TW | 421749 | 2/2001 |
| WO | WO 00/11536 | 3/2000 |

OTHER PUBLICATIONS

Jun. 26, 2012 Office Action issued in Korean Patent Application No. 2007-7004441 w/translation.
May 16, 2012 Office Action issued in Taiwanese Patent Application No. 094127505 w/translation.
Mar. 28, 2011 Search Report issued in European Patent Application No. 05770468.6.
Jul. 27, 2011 Office Action issued in Korean Patent Application No. 2007-7004441 (with English translation).
Oct. 21, 2011 Office Action issued in Taiwanese Patent Application No. 094127505 (with English translation).

\* cited by examiner

SUBSTRATE PROCESSING SYSTEM, METHOD OF CONFIRMATION OF ITS STATE OF USE, AND METHOD OF PREVENTION OF ILLICIT USE

TECHNICAL FIELD

The present invention relates to a substrate processing system for processing a substrate, a method of confirmation of its state of use, and a method of prevention of illicit use.

BACKGROUND ART

A semiconductor element, liquid crystal display element, imaging device, thin film magnetic head, or other device is produced by using a substrate processing system to perform various types of processing on a semiconductor wafer, glass plate, or other substrate. The processing performed by a substrate processing system on a substrate includes for example coating processing for coating a photoresist or other photosensitizer, exposure processing for projection exposure of patterns of a mask or reticle (when referring to these all together, referred to as a "mask") on the substrate coated with the photosensitizer, and development processing for developing the exposed substrate.

The above exposure processing is performed by an exposure apparatus provided in the substrate processing system. The coating processing and development processing are formed by a coater/developer installed in-line with the exposure apparatus. Further, the above exposure apparatus or other substrate processing system is often provided with an evaluation apparatus for evaluating the uniformity of the patterns formed on the variously processed substrate or the degree of overlay of the patterns, an inspection apparatus for detecting the secondary electrons or back scattered electrons when firing an electron beam at the substrate to inspect the patterns formed on the substrate, etc. Further, in this description, "substrate processing system" sometimes means the individual exposure apparatus, coater, developer, evaluation apparatus, inspection apparatus, etc. and sometimes means a combination of two or more of these as a whole.

Note that in a conventional substrate processing system, the control program for controlling the system, utility programs beneficial in operating the system, and other various types of programs are usually attached to the system. These have been provided to the customers of the substrate processing systems free of charge. Further, since the above way of thinking has been the mainstream, usually upgrades of the various types of program have been made available free of charge.

For this reason, once the manufacturer of the substrate processing system sells (transfers) the substrate processing system to a customer, if that customer transfers its used substrate processing system to a third party, the above various types of programs will end up being transferred along with the substrate processing system without the approval of the manufacturer of the substrate processing system. The above various types of programs are inherently copyrighted articles and themselves have asset value. They are not simple attachments to a substrate processing system. Therefore, it is believed desirable to conclude a license agreement with the user (transferee). By concluding such an agreement, the manufacturer of the substrate processing system would be able to centrally manage the installation of the substrate processing system, its remodeling, support, and upgrades of programs and the third party purchasing a used substrate processing system would be able to use the system with confidence, so both sides would benefit.

However, even if the manufacturer of a substrate processing system and its customer conclude the above agreement, if the substrate processing system ends up being transferred to a third party, the above control program etc. could be used without any restriction to operate the substrate processing system, so the manufacturer of the substrate processing system would have to confirm the existence of any transfer by some sort of method and would have to take protective measures to disable use of the control program etc. in the event of their being illicitly used.

DISCLOSURE OF THE INVENTION

According, an object of the present invention is to enable confirmation as to if a user of a substrate processing system is suitably using the substrate processing system and enable prevention of any illicit use recognized.

According to a first aspect of the present invention, there is provided a substrate processing system for processing a substrate comprising a license information storing device which stores license information including a shutdown time of the substrate processing system as usage terms of the substrate processing system for a specific user and a confirming device which confirms a state of use of the substrate processing system based on the license information stored in the license information storing device and time information from a timer, the confirming device confirming the state of use of the substrate processing system by whether the time during which the substrate processing system has been shut down exceeds the shutdown time based on the license information and time information from the timer.

According to a second aspect of the present invention, there is provided a substrate processing system for processing a substrate comprising a license information storing device which stores license information including at least one of device information relating to the substrate processing system and network information relating to a network to which the substrate processing system is connected as usage terms of the substrate processing system for a specific user and a confirming device which refers to at least one of device information and the network information obtained from the substrate processing system and at least one of device information and network information included in the license information to confirm the state of use of the substrate processing system.

According to a third aspect of the present invention, there is provided a substrate processing system for processing a substrate comprising a license information storing device which stores license information including usage terms of the substrate processing system for a specific user, a counter which counts an amount of processing of substrates of the substrate processing system, and a confirming device which confirms the state of use of the substrate processing system based on the license information stored in the license information storing device and count information from the counter.

According to a fourth aspect of the present invention, there is provided a method of confirmation of state of use which confirms the state of use of a substrate processing system for processing a substrate, comprising the steps of preparing a license file storing license information including a shutdown time of the substrate processing system as usage terms of the substrate processing system for a specific user, acquiring time information, and confirming the state of use of the substrate processing system by judging if the time during which the substrate processing system has been shut down exceeds the shutdown time based on the license information stored in the license file and the time information.

According to a fifth aspect of the present invention, there is provided a method of confirmation of state of use which confirms the state of use of a substrate processing system for processing a substrate, comprising the steps of preparing a license file storing license information including at least one of device information relating to the substrate processing system and network information relating to a network to which the substrate processing system is connected as usage terms of the substrate processing system for a specific user and referring to at least one of device information and the network information obtained from the substrate processing system and at least one of device information and network information included in the license information to confirm the state of use of the substrate processing system.

BEST MODE FOR CARRYING OUT THE INVENTION

Below, embodiments of the present invention will be explained in detail with reference to embodiments.

First Embodiment

Figure 1:
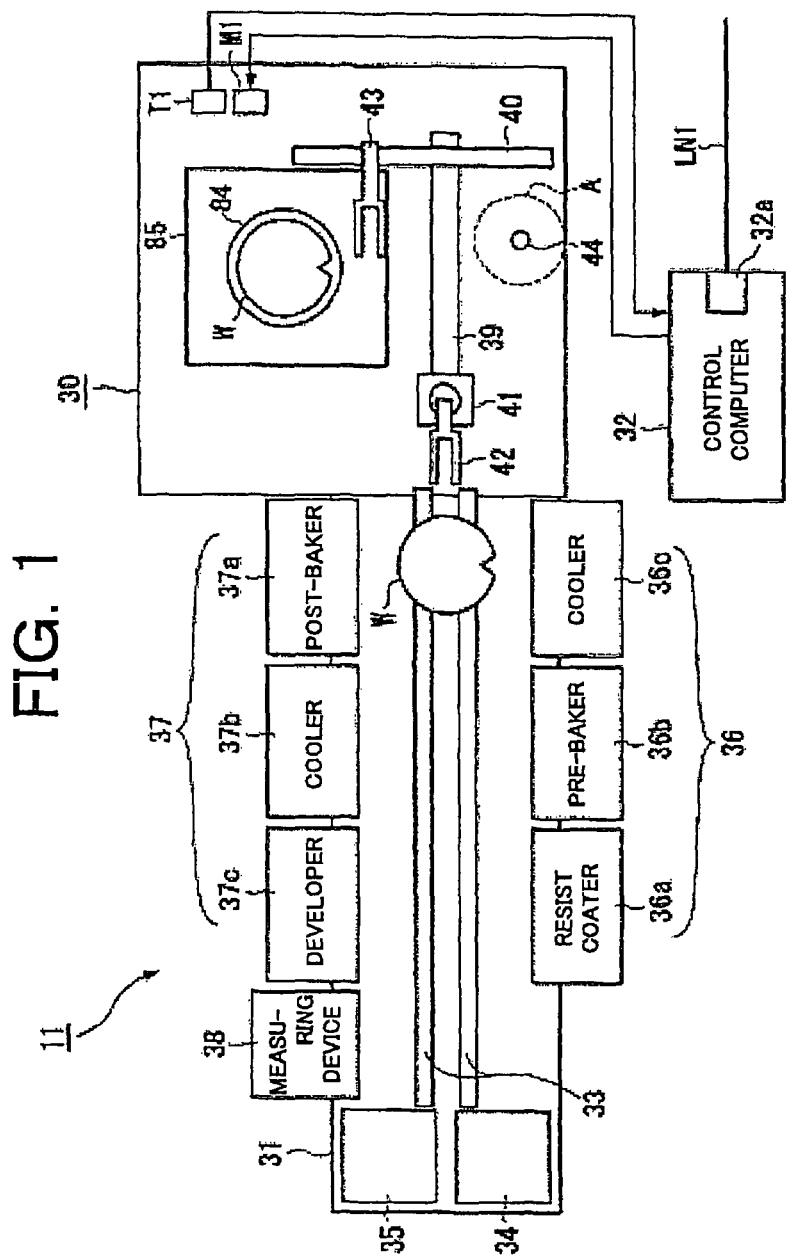
FIG. 1 A top view showing the schematic configuration of a substrate processing system according to a first embodiment of the present invention.

FIG. 1 is a top view showing the schematic configuration of a substrate processing system according to a first embodiment of the present invention. As shown in FIG. 1, this substrate processing system 11 is comprised of an exposure apparatus 30 surrounded by a chamber to which is attached in-line a coater/developer 31 and a control computer 32 controlling the overall operation of the exposure apparatus 30 and coater/developer 31.

This control computer 32 is provided with a network connection card 32a. This network connection card 32a is used by the control computer 32 to connect to a network LN1 laid in the factory in which the substrate processing system 11 is installed. When the network LN1 is an Ethernet®, the network connection card 32a is assigned an unambiguously determined unique physical address (MAC address (Media Access Control address)). The control computer 32 controls the operations of the substrate processing system 11 based on control commands sent from a not shown host computer through the network LN1 and received by the network connection card 32a.

Further, while not shown, a plurality of substrate processing systems 11 having the same configuration as the substrate processing system 11 shown in FIG. 1 are connected to the network LN1. Each of the substrate processing systems 11 includes the TCP/IP (Transmission Control Protocol/Internet Protocol) as communication protocol. Further, each substrate processing system 11 is assigned an unambiguously determined IP address and gateway address. Further, this network LN1 is not connected to any outside network (for example, the Internet) from the viewpoint of maintaining security.

The above coater/developer 31 is run across by a conveyance line 33 for conveying wafers W as substrates. At one end of this conveyance line 33, a wafer carrier 34 storing a large number of unexposed wafers W and a wafer carrier 35 storing a large number of exposed and developed wafers W are arranged. At the other end of the conveyance line 33, an unloading port (not shown) with a shutter is provided at the chamber side of the exposure apparatus 30.

Further, a coater 36 is provided along one side surface of the conveyance line 33 provided at the coater/developer 31, while a developer 37 is provided along the other side surface. The coater 36 is provided with, from the wafer carrier 34 to the exposure apparatus 30, a resist coater 36a for coating a wafer W with a photoresist, a prebaker 36b comprised of a hot plate for prebaking the photoresist on that wafer W, and a cooler 36c for cooling the prebaked wafer W.

The developer 37 is provided with, from the exposure apparatus 30 to the wafer carrier 35, a post-baker 37a for baking the photoresist on an exposed wafer W, that is, so-called PEB (Post-Exposure Bake), a cooler 37b for cooling the PEB'ed wafer W, and a developer 37c for developing the photoresist on the wafer W. Further, in the present embodiment, a measurement device 38 is provided in-line for measuring the shapes of the patterns of the photoresist (resists patterns) formed on the wafer developed by the developer 37c. The measurement device 38 is an inspection device for measuring the shapes of the resist patterns formed on a wafer W (for example, the line widths of the patterns, the overlay error of the patterns, etc.)

While not shown, the exposure apparatus 30, coater 36, developer 37, measurement device 38, and control computer 32 are connected by cable or wirelessly and send and receive signals indicating the start of processing or the end of processing between them. Further, device information showing the device state of these devices and measurement results of the measurement device 38 are output to the control computer 32 and recorded in a hard disk or other storage device provided inside the control computer 32.

Figure 2:
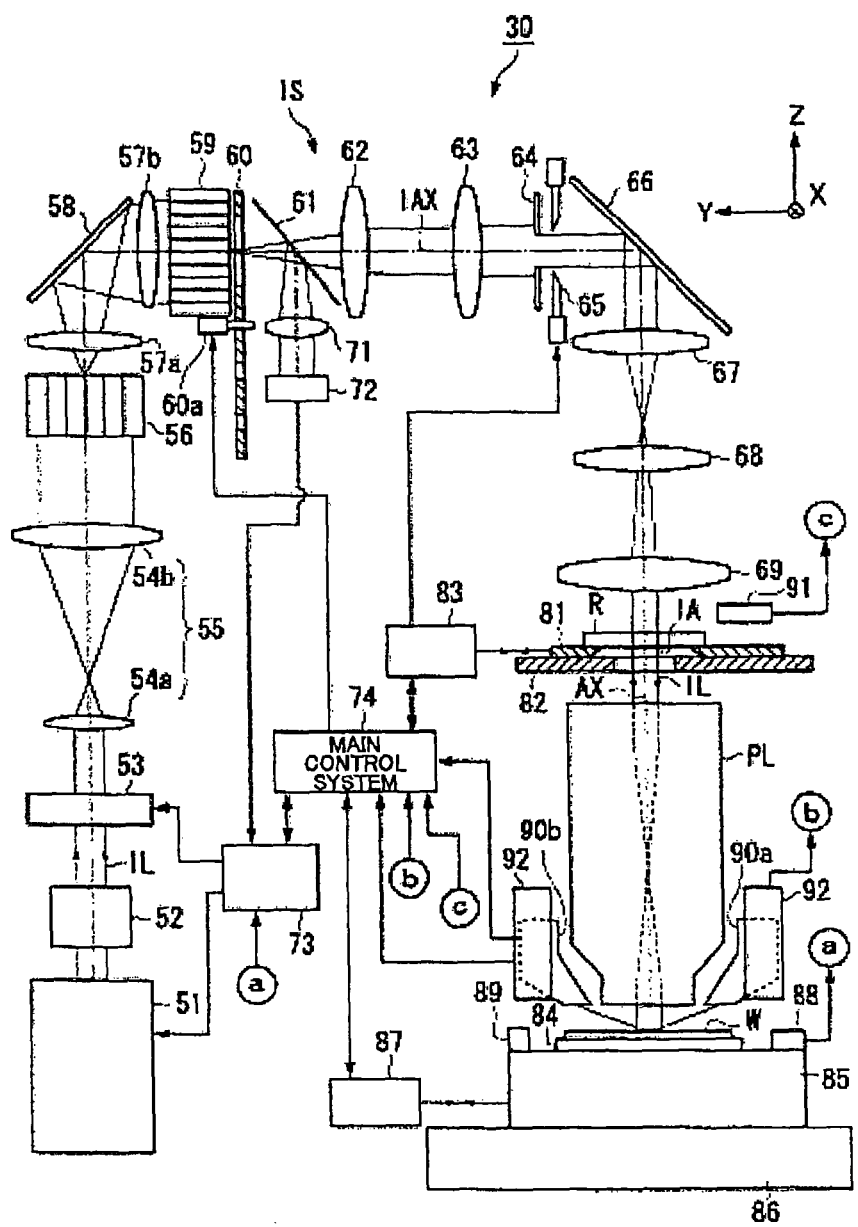
FIG. 2 A view showing the configuration of an exposure apparatus provided in a substrate processing system according to a first embodiment of the present invention.

The exposure apparatus 30 is provided with a wafer stage 85 moving two-dimensionally over a wafer base B6 (see FIG. 2). A wafer W to be exposed is held via a wafer holder 84 on the wafer stage 85. Further, the exposure apparatus 30 is provided inside it with a first guide member 39 so as to substantially follow along the extension of the center axis of the conveyance line 33 provided at the coater/developer 31 and is provided with a second guide member 40 above the end of first guide member 39 so as to perpendicularly intersect it.

The first guide member 39 is provided with a slider 41 configured to be able to slide along the first guide member 39. This slider 41 is provided with a first arm 42 for holding a wafer W and able to rotate and move up and down. Further, the second guide member 40 is provided with a second arm 43 able to slide along the second guide member 40 in a state holding the wafer W. The second guide member 40 extends to a wafer loading position of the wafer stage 85, while the second arm 43 is provided with a mechanism for sliding in a direction perpendicular to the second guide member 40.

Further, near the position where the first guide member 39 and second guide member 40 intersect, a transfer pin 44 able to rotate and move up and down is provided for prealignment of the wafer W. Around the transfer pin 44 is provided a position detector (not shown) for detecting a notch in the outer circumference of the wafer W, the positions of two edge parts, or an orientation flat formed on the outer circumference of the wafer W. The first guide member 39, second guide member 40, slider 41, first arm 42, second arm 43, transfer pin 44, etc. form a wafer loader system.

The exposure apparatus 30 is provided with a plurality of control units (for example, a chamber unit, alignment unit, loader unit, etc.) for controlling the operations of the different parts of the apparatus (for example, the chamber, alignment system, loader system, etc.). Each control unit is provided with a timer for counting the time and a memory for temporarily storing a control signal from the control computer 32. The count results of the timer provided at each control unit are output to the control computer 32. The control computer 32 outputs control signals to the different control units in accordance with the count results of the timers so as to control the operation of the exposure apparatus 30 and confirm the state of use of the substrate processing system 11 including the exposure apparatus 30. Further, in FIG. 1, for simplification, only a timer T1 and a memory M1 provided in the chamber unit are illustrated.

The control computer 32 controls the parts of the substrate processing system 11 so as to perform the exposure processing of a wafer W of course and also confirms whether the substrate processing system 11 is being used as in the content stored in the prestored license file or in contravention to that content. When it is confirmed that the substrate processing system 11 is being illicitly used in contravention to the content stored in the license file, the control computer 32 shuts down the operation of the substrate processing system 11 and disables the substrate processing system 11 until some predetermined action is taken (for example, acquisition of a new license). In the present embodiment, the control computer 32 uses the count results of the timer T1 provided in the chamber unit and the above license file to confirm if the substrate processing system 11 is being illicitly used. Details on this processing will be explained later.

Here, the "license file" is a file storing license information including at least part of the content of a license agreement on the control program for controlling the operation of the substrate processing system 11 concluded in advance between the manufacturer of the substrate processing system 11 and the user of the substrate processing system 11 (purchaser (transferee) of substrate processing system 11) which serves as confirmation material for confirming whether the substrate processing system 11 is being used in contravention to the agreement. As a specific example of this license information, this includes the usage start date, the usage end date or usage period, and shutdown time of the substrate processing system 11, the physical address of the network connection card 32a provided in the control computer 32, the IP address and gateway address assigned to the control computer 32, etc.

Next, the operation when the substrate processing system 11 of the above configuration processes a wafer W will be explained in brief. First, a not shown host computer outputs a processing start command through the network LN1 to the control computer 32 provided in the substrate processing system 11. The control computer 32, based on this processing start command, outputs various types of control signals to the exposure apparatus 30, coater 36, and developer 37. When these control signals are output, a wafer taken out from the wafer carrier 34 is conveyed over the conveyance line 33 to the resist coater 36a where it is coated with photoresist, then is transferred along the conveyance line 33 through the prebaker 36b and cooler 36c to the first arm 42 of the exposure apparatus 30.

After this, the slider 41 travels along the first guide member 39. When it reaches near the transfer pin 44, the first arm 42 rotates, whereby the wafer W coated with the photoresist is transferred from the first arm 42 to the position A over the transfer pin 44. There, the center position and rotational angle are adjusted (prealigned) based on the outer shape of the wafer. After this, the wafer W is transferred to the second arm 43 and conveyed along the second guide member 40 to the wafer loading position. There, it is loaded on the wafer holder 84 on the wafer stage 85. Further, each shot area of that wafer W is exposed through predetermined device patterns of the reticle comprising the mask.

The exposed wafer W is conveyed along the second guide member 40 and first guide member 39 to the conveyance line 33 of the coater/developer 31, then successively sent along the conveyance line 33 to the post-baker 37a and cooler 37b to the developer 37c. Further, relief shape-resist patterns corresponding to the device patterns of the reticle are formed at the shot areas of the wafer W developed by the developer 37c. The thus developed wafer W is according to need inspected for the line widths of the patterns formed, overlay error, etc. by the measurement device 38, conveyed along the conveyance line 33, and stored in the wafer carrier 35. After this lithography process is finished, for example one lot of wafers in the wafer carrier 35 is for example conveyed to the production line for performing the etching or ion implantation or other pattern forming process and resist peeling process.

Next, the exposure apparatus 30 will be explained with reference to FIG. 2. In the present embodiment, a step-and-scan type exposure apparatus will be explained as an example, but in addition to this type of exposure apparatus, the apparatus may also be a step-and-repeat type exposure apparatus (stepper). Further, in the following explanation, an XYZ orthogonal axis coordinate system illustrated in the figure is set and this XYZ orthogonal axis coordinate system is referred to so as to explain the positional relationship of the different members. The XYZ orthogonal axis coordinate system is set so that the Y-axis and Z-axis become parallel to the drawing surface. The X-axis is set to become a direction vertical to the drawing surface. In the XYZ coordinate system in the drawings, actually the XY-plane is set to a plane parallel to the horizontal plane and the Z-axis is set to the vertical direction. The direction along the Y-axis is the scan direction.

In FIG. 2, 51 is an exposure light source. This exposure light source 51 is an ArF excimer laser light source (wavelength 193 nm) emitting exposure light IL of a substantially rectangular shape cross-section comprised of parallel beams. This exposure light source 51 may additionally be, for example, an ultrahigh voltage mercury lamp emitting g-rays (wavelength 436 nm) or i-rays (wavelength 365 nm), a KrF excimer laser (wavelength 248 nm), F2 laser (wavelength 157 nm), Kr2 laser (wavelength 146 nm), YAG laser high frequency generator, or semiconductor laser high frequency generator.

The exposure light IL (exposure beam) comprised of the wavelength 193 nm ultraviolet pulse from the exposure light source 51 passes through a beam matching unit (BMU) 52 and enters an optical attenuator comprised of a variable optical attenuator 53. An exposure control unit 73 for controlling the amount of exposure of the photoresist on the wafer W controls the start, stop, and output (oscillation frequency and pulse energy) of the exposure light source 51 and adjusts the optical attenuation rate at the variable optical attenuator 53 in stages or continuously.

The exposure light IL passing through the variable optical attenuator 53 passes through a beam shaping system 55 comprised of the lens systems 54a, 54b to enter a first stage light integrator (uniformizer or homogenizer) comprised of a first fly eye lens 56. The exposure light IL emitted from this first fly eye lens 56 passes through a first lens system 57a, optical path bending mirror 58, and second lens system 57b to enter a second stage light integrator comprised of a second fly eye lens 59.

At the emission face of the second fly eye lens 59, that is, the optical Fourier transform plane with respect to the pattern surface of the reticle R to be exposed (pupil plane of illumination syste), an aperture stop plate 60 is arranged rotably by a drive motor 60a. The aperture stop plate 60 is provided with a circular aperture stop for normal illumination, an aperture stop for ring illumination, and a plurality of (for example, four) aperture stops for modified illumination comprised of small offset apertures and small circular aperture stops for a small coherence factor (σ value) in a switchable manner. A main control system 74 for controlling the operation of the exposure apparatus 30 as a whole uses the drive motor 60a to rotate the aperture stop plate 60 and set the illumination conditions.

The exposure light IL emitted from the second fly eye lens 59 and passing through any of the aperture stops formed on the aperture stop plate 60 enters the high transmittance, low reflectance beam splitter 61. The exposure light reflected at the beam splitter 61 passes through a condensing lens 71 to enter an integrator sensor 72 comprised of an opto-electric detector. The detection signal of the integrator sensor 72 is supplied to an exposure control unit 73. The relationship between the detection signal of the integrator sensor 72 and the illumination of the exposure light IL on the wafer W is measured in advance by a high precision and stored in the memory of the exposure control unit 73. The exposure control unit 73 is configured so as to be able to monitor the illumination of the exposure light IL (average value) on the wafer and that integrated value indirectly by the detection signal of the integrator sensor 72.

The exposure light IL passing through the beam splitter 61 successively passes along the optical axis IAX through lens systems 62, 63 to enter a fixed blind (fixed illumination field stop) 64 and movable blind (movable illumination field stop) 65. The latter movable blind 65 is set at a conjugate plane with respect to the reticle surface, while the former fixed blind 64 is set at a plane defocused by exactly a predetermined amount from that conjugate plane. The fixed blind 64 has apertures arranged so as to extend in straight slit shapes or rectangle shapes (hereinafter referred to all together as "slit shapes") in directions perpendicular to the scan exposure direction at the center of the circular field of the projection optical system PL.

The exposure light IL passing through the fixed blind 64 and movable blind 65 passes through an optical path bending mirror 66, focusing lens system 67, condenser lens 68, and main condenser lens system 69 to illuminate the illumination area (illumination field area) IA of the pattern surface (bottom surface) of the mask comprised of the reticle R. Further, the BMU 52 to main condenser lens 69 form an illumination optical system IS. Under the exposure light IL, the images of the circuit patterns in the illumination area IA of the reticle R are transferred through a double telecentric projection optical system PL to slit-shaped exposure areas of the photoresist layer on the wafer W arranged on the imaging plane of the projection optical signal PL by a predetermined projection magnification α (α is for example ¼ or ⅕ etc.)

The reticle R is held by suction on a reticle stage 81. The reticle stage 81 is carried so that it can move on a reticle base 82 in the Y-direction at an equal velocity and can be inclinded in the X-direction, Y-direction, and rotation direction. The two-dimensional position and rotational angle of the reticle stage 81 (reticle R) are measured in real time by a laser interferometer in the drive control unit 83. Based on this measurement result and control information from the main control system 74, the drive motors in the drive control unit 83 (linear motor, voice coil motor, etc.) control the scan speed and position of the reticle stage 81.

On the other hand, the wafer W is held by suction through a wafer holder 84 on a wafer stage 85. The wafer stage 85 is moved two-dimensionally on the wafer base 86 along an XY plane parallel to the image plane of the projection optical system PL. That is, the wafer stage 85 is moved on the wafer base 86 in the Y-direction at a constant speed and is moved by steps in the X-direction and Y-direction. Further, the wafer stage 85 also has a Z-leveling mechanism for controlling the position (focus position) of the wafer W in the Z-direction and the angle of inclination about the and X-axis and Y-axis.

The positions of the wafer stage 85 in the X-direction and Y-direction and the rotational angles about the X-axis, Y-axis, and Z-axis are measured in real time by a laser interferometer in the drive control unit 87. Based on this measurement result and control information from the main control system 74, the drive motors (linear motor etc.) in the drive control unit 87 control the scan speed and position of the wafer stage 85. Further, the wafer stage 85 has fixed on it at one end a illumination sensor 88 for detecting the illumination (amount of light) of the exposure light IL irradiated on an exposure area on the wafer W through the projection optical system PL.

This illumination sensor 88 is for example a sensor having a housing formed with a pinhole sensor and with a light receiving element arranged at the position of formation of this pinhole and detects the illumination (amount) of the exposure light IL entering through the pinhole. The detection signal of the illumination sensor 88 is supplied to the exposure control unit 73. By moving the illumination sensor 88 within the exposure area in the state with the wafer stage 85 irradiated by exposure light IL, the illumination uniformity (light uniformity) of the exposure light IL and cumulative light uniformity can be measured. Further, by moving the illumination sensor 88 in the Z-direction and detecting the illumination of the exposure light IL, it is possible to find the image plane position (best focus position) of the projection optical system PL. The illumination using this sensor 88, this illumination uniformity, and the cumulative light uniformity are measured and the best focus position is measured periodically or as desired.

Further, the wafer stage 85 is provided at one end with a reference member 89 for finding the reference position of the wafer stage 85. This reference member 89 is used to measure the relative position of the reticle R with respect to the coordinate system of the wafer stage 85 and the base line amount. Here, the "base line amount" means for example the distance between the center position of the images of the patterns formed on the reticle R projected by the projection optical system PL and the center of the measurement field of the later explained wafer alignment sensor 92. This reference member 89 is provided with reference marks comprised of, for example, five slit patterns comprised of light passing L-shaped patterns and two reference patterns formed by light reflecting chrome (duty ratio 1:1).

Further, at the side of the projection optical system PL, a multipoint autofocus signal comprised of a projection optical system 90a for projecting slit images at an angle on a plurality of measurement points on the surface of the wafer W (detected surface) and a reception optical system 90b receiving the reflected light from that detected surface and generating focus signals corresponding to the focus positions of the plurality of measurement points is provided. These focus signals are supplied to the main control system 74. The positional deviation of the position of the wafer W with respect to the image plane of the projection optical system PL, that is, the focus error, is found from the difference between the best focus position measured using the above illumination sensor 88 and the image plane position measured by the autofocus sensor.

That is, the autofocus sensor is set so that the detection results obtained in the state where the image plane of the projection optical system PL and the surface of the wafer W match become zero. For this reason, if the position of the projection optical system PL in the image plane or the optical parts set in this autofocus sensor or mechanical mechanism holding these parts are affected by environmental changes, even if the surface of the wafer W is actually set in the image plane of the projection optical system PL, the detection results of the autofocus sensor will not match with zero and measurement error will occur. The position of the wafer W in the Z-direction is controlled based on the detection results of the autofocus sensor, so measurement error of the autofocus sensor becomes a cause of focus error at the time of exposure. Therefore, if finding the difference between the best focus position measured using the illumination sensor 88 and the image plane position measured by the autofocus sensor, it is possible to find the focus error.

Further, during the scan exposure, it is necessary to align the reticle R and wafer W in advance. For this reason, above the reticle stage 81, a VRA (Visual Reticle Alignment) type reticle alignment sensor 91 is set for measuring the positions of the alignment marks (reticle marks) of the reticle R. Further, to measure the positions of the alignment marks (wafer marks) on the wafer W, an image processing type (FIA type: Field Image Alignment type) wafer alignment sensor 92 is set off axis at the side of the projection optical system PL. The wafer alignment sensor 92 for example uses the relatively broad wavelength band illumination light from a halogen lamp etc. to illuminate alignment marks on the wafer W and uses a CCD (Charge Coupled Device) or other imaging device to capture that image. The image signal obtained by the wafer alignment sensor 92 is supplied to the main control system 74 where it is processed to measure the position information.

The main control system 74 is provided at the control computer 32 shown in FIG. 1. It reads the various types of exposure conditions for scan exposure of the photoresist of the shot areas of the wafer W by suitable exposure amounts from the exposure data file and executes the optimal exposure sequence linked with the exposure control unit 73. Before the exposure processing, the main control system 74 adjusts the position and posture of the wafer W in the optical axis AX-direction based on the detection results of the autofocus sensor and uses the wafer alignment sensor 92 to measure the position information of a predetermined number (three to nine) of alignment marks formed on the wafer W. Further, it uses the measured position information for statistical processing called "EGA (enhanced global alignment) processing" so as to find the array of all shot areas set on the wafer W.

When the exposure processing is started, the main control system 74 sends the movement positions, movement speeds, movement accelerations, position offsets, and other various types of information of the reticle stage 81 and wafer stage 85 to the drive control units 83, 87. Due to this, the reticle stage 81 and wafer stage 85 start to be accelerated. Further, the main control system 74 issues a scan exposure start command to the exposure control unit 73 as well. When the reticle stage 81 and wafer stage 85 finish being accelerated and the speeds become constant, the exposure control unit 73 starts the emission of the exposure light source 51 and calculates the integrated value of the illumination of the exposure light on the wafer W through the integrator sensor 72 (sum of pulse energy per unit time). That integrated value is reset to 0 at the time of start of the scan exposure.

During the scan exposure, the reticle R is scanned through the illumination area IA of the exposure light IL in the +Y direction (or −Y direction) at the speed Vr through the reticle stage 81. In synchronization with this, the wafer W is scanned through the exposure area of the pattern images of the reticle R in the −Y direction (or +Y direction) at the speed $\alpha \cdot Vr$ ($\alpha$ is the projection magnification from the reticle R to the wafer W) through the wafer stage 85. The directions of movement of the reticle R and wafer W are opposite since the projection optical system PL of this example performs reverse projection. Further, even during the scan exposure, the posture of the wafer W is controlled based on the detection results of the autofocus sensor.

Further, during scan exposure, the exposure control unit 73 successively calculates the integrated value of the illumination of the exposure light IL and controls the output of the exposure light source 51 (oscillation frequency and pulse energy) and optical attenuation rate of the variable optical attenuator 53 in accordance with the results so as to give the suitable exposure amounts at the different points of the photoresist on the wafer W after scan exposure. Further, at the end of the scan exposure of the shot area, it stops the emission of the exposure light source 51. By repeating this operation, the plurality of shot areas set on the wafer W are exposed.

Next, the processing by the control computer 32 provided in the substrate processing system 11 will be explained. As explained above, the substrate processing system 11 uses the count results of the timer T1 provided in the chamber unit and the content stored in the license file to confirm whether the substrate processing system 11 is being illicitly used. As the confirmation method, there are "check of the usage end date", "check of the usage period", and "check of the shutdown time".

Here, "the check of the usage end date" means processing for confirming whether the usage end date set by the agreement has past from the usage start date set by the agreement (usage start date of control program for controlling substrate processing system 11) so as to confirm the state of use of the substrate processing system 11. Further, "the check of the usage period" means processing for confirming whether the operating time of the substrate processing system 11 from the usage start date set by the agreement has exceeded a cumulative usage period set by the agreement so as to confirm the state of use of the substrate processing system 11. The above processing confirms if the substrate processing system 11 is being used as stipulated in the agreement.

Further, "the check of the shutdown time" means processing for confirming if the time during which the operation of the substrate processing system 11 has shut down has exceeded a predetermined threshold so as to confirm the state of use of the substrate processing system 11. Work for restoring malfunctions occurring in the substrate processing system 11 is normally completed in two or three days, while work for moving the substrate processing system 11 takes seven to 10 days. For this reason, the threshold for judging if the substrate processing system 11 has been moved is set to about four to five days.

Here, to enable the above confirmation reliably, the current time has to be accurately obtained and the time has to be managed. The control computer 32a of the substrate processing system 11 is connected to the network LN1, so, for example, the time can be managed by constructing an NTP (Network Time Protocol) server and having each of the control computers 32 provided in the substrate processing system 11 refer to the NTP server. However, as explained above, to ensure security, the network LN1 is not connected to any outside network like the Internet, so time management under the control of the manufacturer of the substrate processing system 11 is not possible. For this reason, in the present embodiment, time management becomes necessary under the closed environment of the factory.

The substrate processing system 11 is provided with various timers. Time management is possible if using the count results of these timers. However, the count results of timers provided in the substrate processing system 11 are liable to be tampered with. If the count results of the timers are tampered with, it means that the substrate processing system 11 is being illicitly used. Here, a password is required when an operator tries to access the chamber unit, so there is little possibility of the content of the timer T1 provided in the chamber unit being tampered with. Therefore, in the present embodiment, the count results of the timer T1 provided in the chamber unit with the low possibility of tampering are used for the time management.

By using the content stored in the above-mentioned license file and the count results of the timer T1 to periodically perform the "check of the usage end date", the "check of the usage period", and the "check of the shutdown time", it can be confirmed whether the substrate processing system 11 is being illicitly used. In addition to this, in the present embodiment, the existence if any move can be reliably confirmed by whether the physical address of the network connection card 32a, the IP address and gateway address assigned to the control computer 32, etc. match with those contained in the license file. This confirmation method and method of prevention of illicit use will be explained in detail below.

Figure 3:
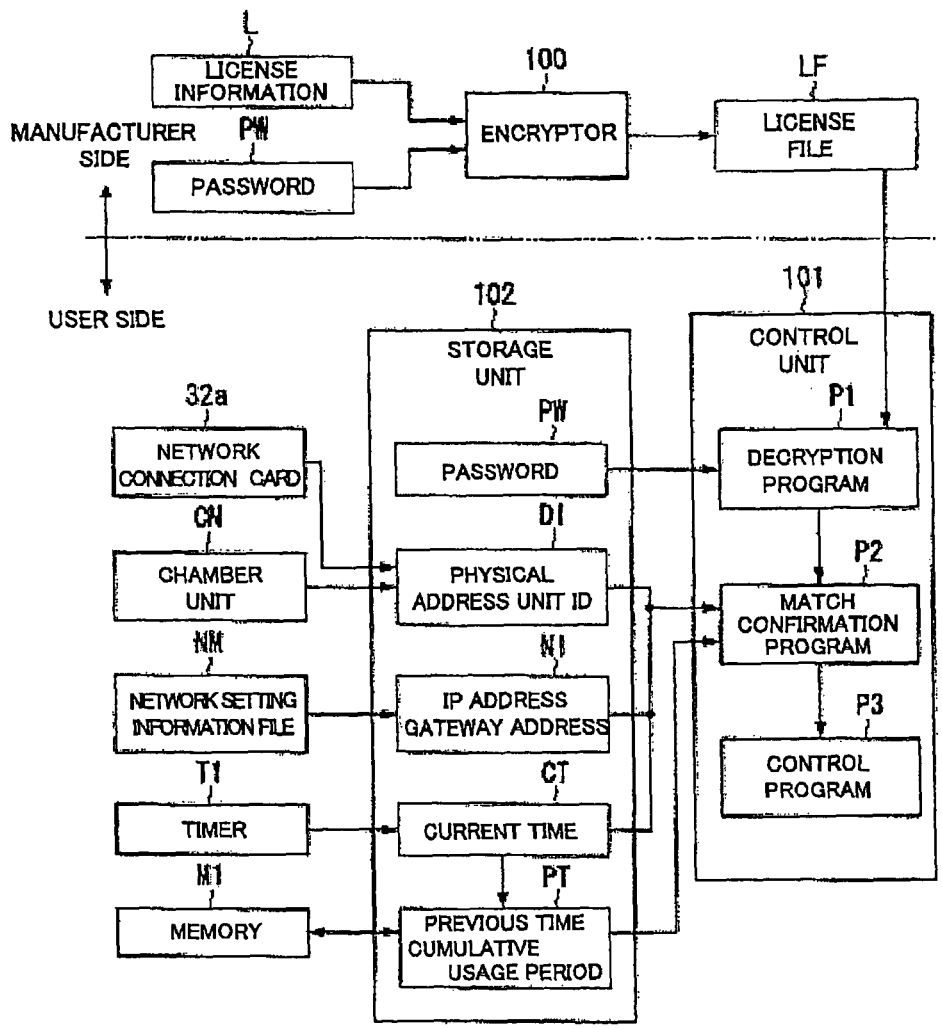
FIG. 3 A view for explaining a method of confirmation of the state of use of a substrate processing system according to a first embodiment of the present invention and a method of prevention of illicit use.

FIG. 3 is a view for explaining the method of confirmation of state of use and method of prevention of illicit use of a substrate processing system according to a first embodiment of the present invention. Further, in FIG. 3, parts corresponding to parts shown in FIG. 1 and FIG. 2 are assigned the same reference notations. The CN in FIG. 3 indicates the chamber unit provided in the exposure apparatus 30 (illustration omitted in FIG. 1 and FIG. 2), while NM indicates a network setting information file provided in the control computer 32 and storing network setting information. Here, the "network setting information" is information including the IP address and gateway address assigned to the control computer 32. Further, the control unit 101 and storage unit 102 are provided in the control computer 32.

First, the manufacturer of the substrate processing system 11 and the user of the substrate processing system 11 (the purchaser (transferee) of the substrate processing system 11) conclude a license agreement on a control program for controlling the operation of the substrate processing system 11. The manufacturer of the substrate processing system 11 determines the license information L. Here, as the license information L, the usage start date (licensing date), usage end date or usage period, and shutdown time of the substrate processing system 11 and the physical address of the network connection card 32a provided in the control computer 32, IP address and gateway address assigned to the control computer 32, destination network address of the control computer 32, etc. are included. Further, to prevent leakage and tampering of the license information, a password PW for the license information is set. This password PW is managed by the manufacturer of the substrate processing system 11.

After determining the above license information L and setting the password PW, an encrypter 100 provided at the manufacturer of the substrate processing system 11 is used to encrypt the license information L by the password PW and prepare the license file LF. Further, the encryption method used here may be any of the DES, RC4, or other common key systems where the encryption and decryption keys are the same or the RSA or other public key systems where the encryption and decryption keys are different.

Further, as explained later, an MD5, SHA-1, or other hash function (indecipherable function) may be used to confirm there is no tampering without decrypting the license information L.

Here, the common key system with its fast processing time for encryption, the public key system with its slow processing time, but strong encryption strength, and the hash function system with its superior antitampering check may be selectively used alone or in combination for each type of data.

The prepared license file LF is stored in the storage unit 102 provided in the control computer 32 of the substrate processing system 11. Further, in FIG. 3, for convenience, the license file LF is illustrated as being directly input to the control unit 101 provided in the control computer 32. Further, along with the license file LF, the password PW used at the time of encrypting the license information L is stored in the storage unit 102.

When the above work is completed and the substrate processing system 11 is started up, the license file LF and password PW stored in the storage unit 102 are read out and the license file LF is decrypted by the decryption program P1 provided in the control unit 101. Further, the Ethernet® physical address is read out from the network connection card 32a provided in the control computer 32, the unit identifier (unit ID) is read out from the chamber unit CN, and these are stored as device information DI in the storage unit 102. Further, the IP address and gateway address assigned to the control computer 32 are read out from the network setting information file NM and stored as network information NI in the storage unit 102. Further, the current time CT is read out from the timer T1 provided in the chamber unit CN and stored in the storage unit 102.

Next, the match confirmation program P2 provided in the control unit 101 confirms the match between the content of the license file LF decrypted by the decryption program P1 and the device information DI, network information NI, and current time CT stored in the storage unit 102. Specifically, it confirms if the Ethernet® physical address and unit ID included in the device information DI and IP address and gateway address included in the network information NI and destination network address of the control computer match with those stored in the license file LF. By this, it is possible to for example confirm if a move has result in a change in the device configuration of the substrate processing system 11 and the network environment.

Further, the match confirmation program P2 uses the current time CT stored in the storage unit 102 and the usage start date (licensing date), usage end date or usage period, and shutdown time of the substrate processing system 11 stored in the decrypted license file LF to perform the "check of the usage end date", "check of the usage period", and "check of the shutdown time" so as to confirm that the substrate processing system 11 is being used as stipulated in the agreement. Specifically, in the "check of the usage end date", it confirms if the current time CT before the usage end date, while in the "check of the usage period", it confirms if the cumulative usage period PT found by adding the elapsed times of the current time CT is within the usage period set by the agreement of the substrate processing system 11.

Further, in the "check of the shutdown time", it writes the current time CT as the previous time PT in the memory M1 provided in the chamber unit CN at the time of the end of operation of the system, reads out the previous time PT written into the memory M1 at the next startup time, and confirms if the elapsed time from the previous time PT to the current time CT is within the above shutdown time. Further, the settings for whether or not to perform the "check of the usage end date", "check of the usage period", and "check of the shutdown time" are stored encrypted in the license file LF stored in the storage unit 102. The content written in the memory M1 is password protected.

When the result of the above confirmation is that the substrate processing system 11 is not being used as stipulated in the agreement, the match confirmation program P2 outputs information showing that effect to the control program P3 controlling the operations of the parts of the substrate processing system 11. Based on this information, the control program P3 shuts down the operation of the substrate processing system 11. If the control program P3 shuts down the operation of the substrate processing system 11 based on the information from the match confirmation program P2, the operation of the substrate processing system 11 can no longer be restarted by just restarting the substrate processing system 11. The operation of the substrate processing system 11 remains shut down until a predetermined action (for example, acquisition of a new license) is performed.

If a new license is acquired, a new license file LF is prepared. This license file LF and the password W used at the time of preparation of the license file LF are stored in the storage unit 102 of the control computer 32, then the substrate processing system 11 is restarted, whereby the operation of the substrate processing system 11 is restarted. Here, it is also possible not to change the password PW but to use one the same as the past. Further, when it is confirmed by the above that the substrate processing system 11 is being used as stipulated in the agreement, the operation of the substrate processing system 11 is not shut down and normal operation is continued.

According to the present embodiment, the "check of the usage end date", "check of the usage period", "check of the shutdown time", and other various types of check are performed by the content of the file storing license information including all or part of the content of the license agreement of the control program controlling the operation of the substrate processing system 11 concluded between the manufacturer of the substrate processing system and the customer and the count results of the timer T1, so whether the substrate processing system 11 is being illicitly used can be confirmed.

Further, when there is the fact of illicit use, the operation of the substrate processing system 11 is shut down until a predetermined action is taken, so continued illicit use of the substrate processing system 11 can be prevented.

Note that in the above explanation, whether the substrate processing system 11 is being used as stipulated in the agreement was confirmed at the time of startup of the substrate processing system 11, but the confirmation may also be performed at the time of exchange of the wafers W, at the time of alignment of a wafer W or reticle R, at the time of start of exposure, at the time of end of exposure end, and at other predetermined timings during the exposure processing sequence. Further, for the above "check of the shutdown time", if performing this at certain time intervals (for example, every minute) when finishing sending the chamber status check or other command sent to the chamber unit CN, this would be effective for reliably confirming the shutdown of the substrate processing system 11.

Further, the explanation was given assuming that the timer T1 in the above embodiment was one counting the current time used in a normal microcomputer etc. (year, month, day, hour, minute, and second), but the invention is not limited to this. For example, a day counter counting the number of days elapsed from a licensing date may also be used.

Further, for the method of stopping the operation of the substrate processing system 11 in the case where it is confirmed the substrate processing system 11 is not being used as stipulated in the agreement, any method in addition to the software like method explained above may be used. For example, usually the chamber unit CN is provided with an emergency stop button. It is possible to utilize this electrical circuit so as to activate this button internally when illicit use is confirmed and thereby shut down the operation of the substrate processing system 11 including the chamber unit CN. To reset the substrate processing system 11 shut down in operation by this method, it is preferable that reset not be possible except by the method of manual reset by the operator using a dedicated key of the manufacturer of the substrate processing system 11. Further, that this dedicated key is preferably different for each substrate processing system 11.

Further, the wafer loader system (not shown), reticle stage 81, wafer stage 85, and illumination optical system IS provided in the exposure apparatus 30 shown in FIG. 2 may be provided with mechanical stoppers and these stoppers used to mechanically shut down the operation of the exposure apparatus 30 when it is confirmed that the substrate processing system 11 is not being used as stipulated in the agreement. For example, the loader system may lock the conveyor arm, the stage system may block the interferometer optical path, the illumination optical system may close the shutter, etc. It would be effective if these stoppers were provided at locations which a third party could not operate.

In the above embodiment, the password PW and license file LF were stored in a storage unit 102 provided in the control computer 32. The license file storing the license information etc. is encrypted, so leakage and tampering of the license information can be prevented. However, if backing up the encrypted license file and password PW after licensing and rewriting this license file in the storage unit 102 when necessary, the "check of the usage end date", "check of the usage period", and "check of the shutdown time" could be avoided. For this reason, it is desirable to store these in the password protected memory M1 of the chamber unit CN and have the decryption program P1 read these out from the memory M1.

Second Embodiment

Figure 4:
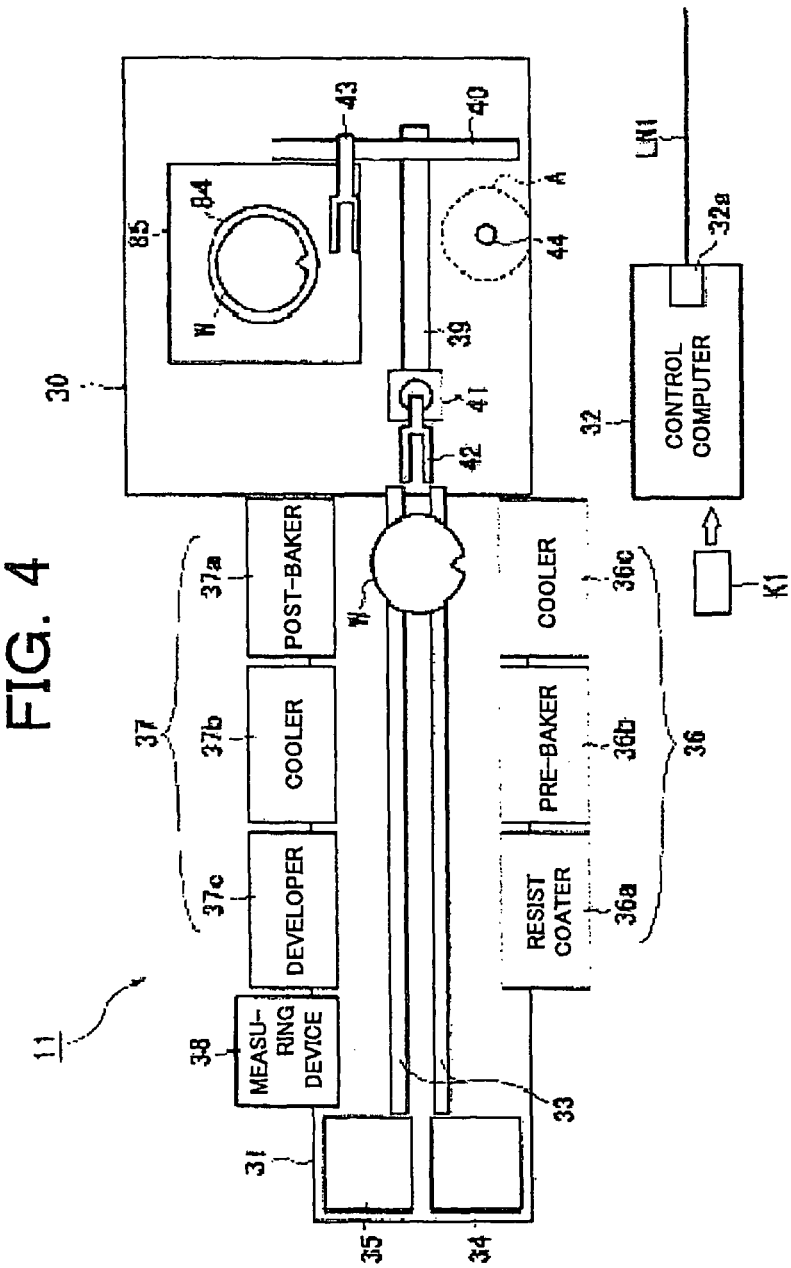
FIG. 4 A top view showing the schematic configuration of a substrate processing system according to a second embodiment of the present invention.

FIG. 4 is a top view showing the schematic configuration of a substrate processing system according to a second embodiment of the present invention. The substrate processing system 11 according to a second embodiment of the present invention shown in FIG. 4 and the substrate processing system according to the first embodiment of the present invention 11 shown in FIG. 1 differ on the point that a port (not shown) in which a protect key K1 functioning as the key required for operating the substrate processing system 11 is provided in the control computer 32. Here, the protect key is a hardware protection device called a "dongle" used inserted into the USB port or parallel port of a computer. Further, in the above-mentioned first embodiment, the timer T1 provided in the chamber unit was used to confirm the state of use of the substrate processing system 11, but the present embodiment differs in the point of confirming the state of use of the substrate processing system 11 without using the timer T1. Further, the chamber unit may also be provided with the timer T1 and memory M1 in the present embodiment as well, but illustration of these in FIG. 4 is omitted to clarify the difference.

In the present embodiment, the substrate processing system 11 cannot be operated unless inserting the protect key K1 into the port provided at the control computer 32. This protect key K1 is provided with a timer and memory and is protected from access from the outside by a password. For this reason, if using the timer provided at the protect key K1 instead of the timer T1 in the above-mentioned first embodiment (see FIG. 1 and FIG. 3), it is also possible to perform the "check of the usage end date", "check of the usage period", and "check of the shutdown time". Further, the protect key K1 is password protected, so it is also possible to use the memory in the protect key K1 instead of the memory M1 in the above-mentioned first embodiment (see FIG. 1 and FIG. 3).

In the present embodiment, if reading the "chamber unit CN" in FIG. 3 as the "protect key K1", reading the "unit ID" as the protect key ID, and reading the "timer T1" and "memory M1" as the "timer" and "memory" in the protect key K1, a similar method as in the first embodiment may be used to confirm illicit use of the substrate processing system 11 and prevent illicit use. Further, it is also possible to add the configuration of the present embodiment to the configuration of the above-mentioned first embodiment and store the license file LF and password PW etc. in both the chamber unit CN and protect key K1. By adopting this configuration, it is possible to prepare against unforeseen hardware failure. Further, it is also possible to periodically or intermittently compare the license files LF stored in a plurality of locations to confirm that they are not any different and thereby check for the existence of any tampering.

Third Embodiment

Figure 5:
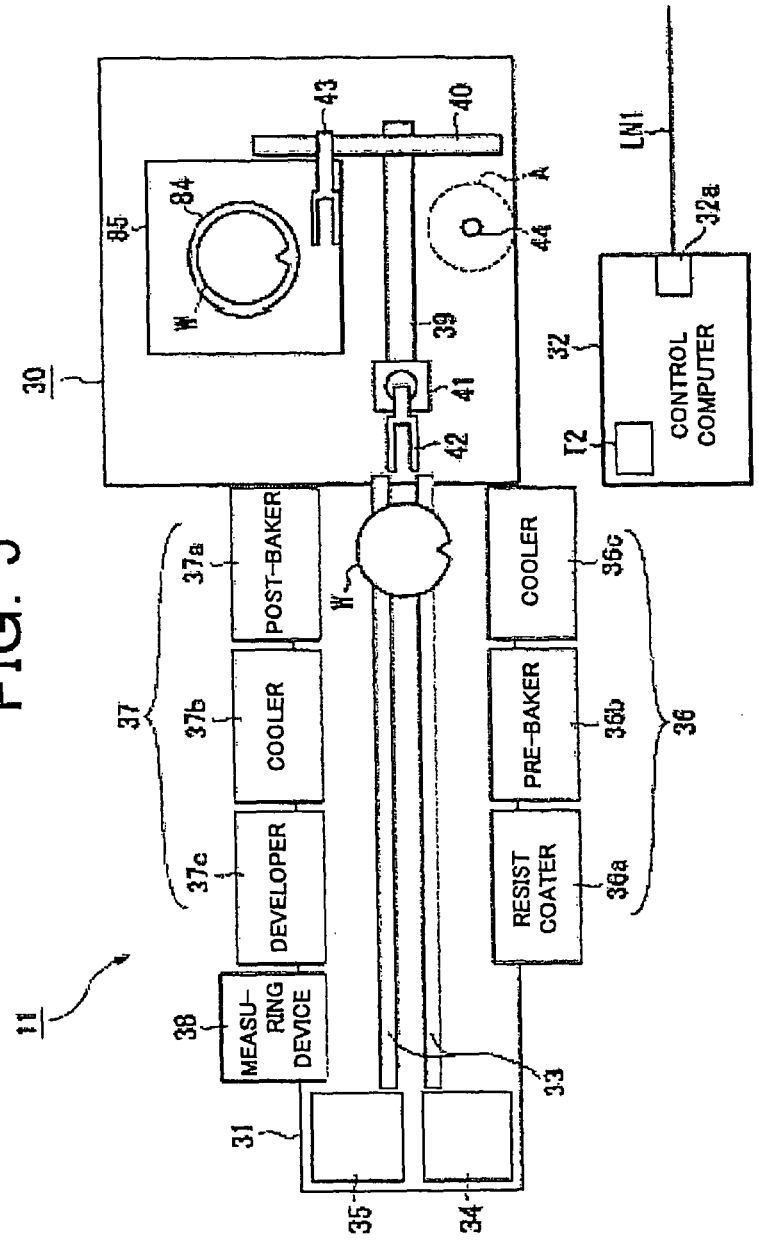
FIG. 5 A top view showing the schematic configuration of a substrate processing system according to a third embodiment of the present invention.

FIG. 5 is a top view showing the schematic configuration of a substrate processing system according to a third embodiment of the present invention. The substrate processing system 11 according to a third embodiment of the present invention shown in FIG. 5 and the substrate processing system according to the first embodiment of the present invention 11 shown in FIG. 1 differ on the point that the former uses a timer T2 provided in the control computer 32 to confirm the state of use of the substrate processing system 11. Further, the chamber unit may be provided with a timer T1 and memory M1 and the control computer 11 may be provided with a port for insertion of a protect key K1 in the present embodiment as well, but illustration of these is omitted in FIG. 5 to clarify the point of difference.

The chamber unit CN explained in the first embodiment and the protect key K1 explained in the second embodiment are provided with batteries for operation of the timers even when the operation of the exposure apparatus 30 is shut down. Due to this, even when the substrate processing system 11 is shut down, the timer T1 of the chamber unit CN and the timer of the protect key K1 can be kept operating for several years.

However, the continuous operation time by a battery is limited to several years. When a battery is completely used up and the timer stops, illicit use may be subsequently performed. To prevent this, it is necessary to mount a long-life battery, periodically replace the batteries, or take other measures. Further, in the above-mentioned first embodiment and second embodiment, a command for reading the count result of the timer T1 or the count results of the protect key K1 has to be newly established. This would give rise to the possibility of a need for a major overhaul of the control computer 32.

Therefore, in the present embodiment, the count result of the timer T2 provided in the control computer 32 is used to confirm the state of use of the substrate processing system 11. This timer T2 is also provided with a backup battery, but usually is supplied with power from the main power source, so this battery is not used much at all. For this reason, even if the supply of power from the main power source is temporarily cut off, the timer T2 can continue to operate for decades using the battery. However, the timer T2 provided in the control computer 32 is highly susceptible to tampering in its count results. For this reason, in the present embodiment, means for preventing tampering shown in the following (1) to (3) (for example, anti-tampering program) are provided in the control computer 32.

(1) Information of the usage start date (licensing date) of the substrate processing system 11 and the day counter are recorded encrypted in the encrypted license file LF and it is confirmed if the time shown by the sum of the same (hereinafter referred to as the "confirmed time") matches with the time of the count result of the timer T2 or if the confirmed time is before the time of the count result of the timer T2. If the above confirmed time were after the time indicated by the count result of the timer T2, it would mean that the timer T2 had been tampered with to indicate a previous time. In this case, it would possible to correct the time of the timer T2 to the confirmed time and then confirm the state of use of the above-mentioned substrate processing system 11 so as to confirm whether the substrate processing system 11 is being used as stipulated in the agreement.

Further, when performing the "check of the usage end date", if the above confirmed time is before the time of the count result of the timer T3, it is preferable to automatically current the confirmed time to match with the current time. This is because if shutting down the operation of the substrate processing system 11 for several days for maintenance, the confirmed time will become difficult from the actual time and will have to be corrected. Further, when performing the "check of the usage period", this correction is not performed.

(2) The current time is recorded in the encrypted license file LF at the time of startup of the match confirmation program P2 or at a preset time interval or any timing and, when the current time is newly recorded in the license file LF, it is confirmed if the previously recorded time is before the current time. If the previously recorded time were after the current time, it would mean the timer T2 had been tampered with.

(3) Various types of programs provided in the control unit 101 perform various types of processing while preparing folders and files in the storage unit 102. Therefore, it is confirmed at a preset time interval or any timing if the time of preparation of a specific folder or file is before the current time indicated by the count result of the timer T2. If the time of preparation of the folder or file were after the current time, it would mean the timer T2 had been tampered with.

Further, when the method of the above (2) or (3) confirms that the timer T2 has been tampered with, it is preferable that the control program P3 shut down the operation of the substrate processing system 11 and keep the operation of the substrate processing system 11 shut down until a predetermined action (for example, acquisition of a new license) has been taken. Further, if a device configuration in which the timer T1 explained in the above-mentioned first embodiment or the timer provided in the protect key K1 explained in the second embodiment can be used, the count results of these timers may also be used to correct the timer T2.

The method of confirming tampering with the timer T2 may be any of the above (1) to (3) alone or (1) and (3) in combination or (2) and (3) in combination. Further, in the antitampering measure of (2), if providing at least one of the timer T1 and protect key K1, it would also be possible to record the current time in these without recording it in the license file LF. Further, in the present embodiment, in FIG. 3, if reading the "timer T1" as the "timer T2" and making the memory M1 the memory provided in the storage unit 102, a similar method as in the first embodiment could be used to confirm illicit use of the substrate processing system 11 and prevent illicit use.

Fourth Embodiment

Figure 6:
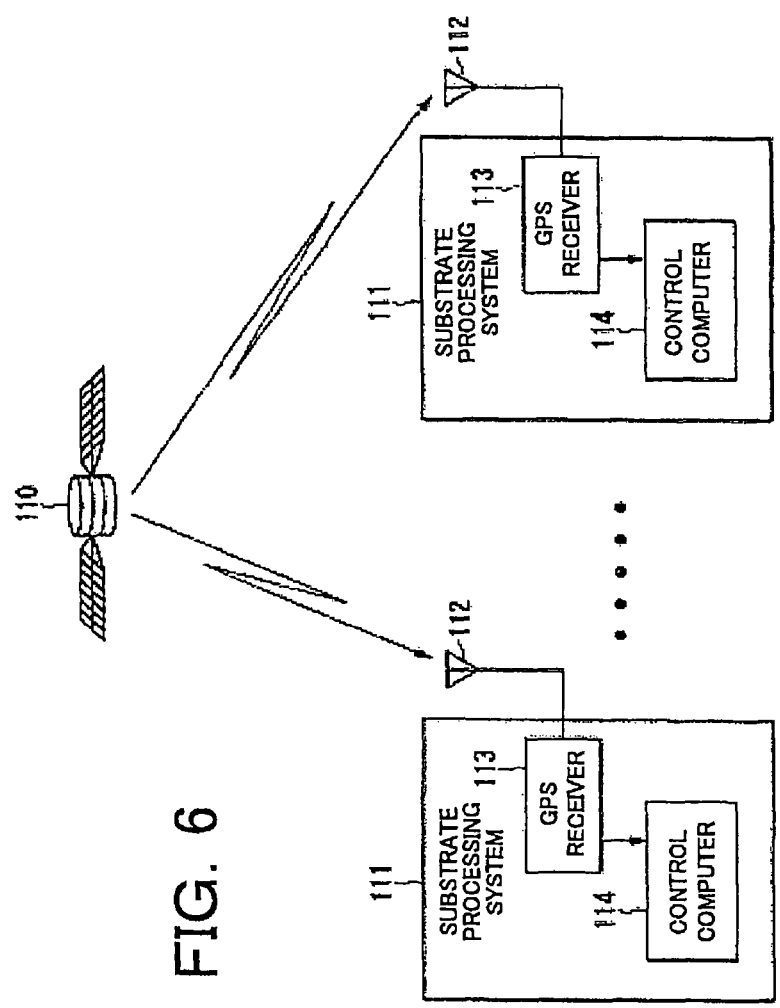
FIG. 6 A top view showing the schematic configuration of a substrate processing system according to a fourth embodiment of the present invention.

FIG. 6 is a view of the schematic configuration of a substrate processing system according to a fourth embodiment of the present invention. As shown in FIG. 6, the substrate processing system 111 of the present embodiment is comprised of an antenna 112 for receiving a signal emitted from a GPS (Global Positioning System) satellite 110, a GPS receiver 113, and a control computer 114. Further, this substrate processing system 111 is provided with the coater/developer 31 shown in FIG. 1 and the exposure apparatus 30 shown in FIG. 2.

The GPS receiver 113 detects the position where the substrate processing system 111 is installed based on the signal emitted from the GPS satellite 110 and received by the antenna 112 and outputs it to the control computer 114. The control computer 114 controls the parts of the substrate processing system 111 in the same way as the control computer 32 shown in FIG. 1 to perform the exposure processing of the wafer W of course and also confirms whether the substrate processing system 111 has been moved based on the position detection results output from the GPS receiver 113. When it is judged by this confirmation that the substrate processing system 111 has been moved, the control computer 114 uses a similar method of prevention of illicit use as in the above-mentioned first embodiment to stop the operation of the substrate processing system 111 and disables the substrate processing system 111 until predetermined action is taken (for example, acquisition of new license).

Here, the user of the substrate processing system 111 (purchaser (transferee) of the substrate processing system 111) may sometimes move the substrate processing system 111 in its own factory due to a change in layout etc. or may sometimes move the substrate processing system 111 to another of its own factories. The movement of the substrate processing system 111 in such cases is legitimate, so it is not desirable that such movement result in the substrate processing system 111 being shut down and disabled. However, if allowing unrestricted movement, the control program for controlling the operation of the substrate processing system 111 is liable to be illicitly used.

For this reason, when the manufacturer of the substrate processing system 111 and the user of the substrate processing system 111 (purchaser (transferee) of the substrate processing system 111) conclude a license agreement for the control program for controlling the operation of the substrate processing system 111, it would be desirable to consider the possibility of movement of the substrate processing system 111 and set a reasonable threshold for judging if the substrate processing system 111 has been moved (movable range). For example, if the user has no plans to move the system between its own factories, for example, it is desirable to set a threshold of several hundred meters so as to allow movement just within the factory where the substrate processing system 111 was initially installed. By setting a threshold in this way, for example, it is possible to allow movement in Japan, but not allow movement overseas. If including the above threshold as part of the license information in the license file LF and compare this threshold with the detection results of the GPS receiver 113, it is possible to confirm the existence of any move of the substrate processing system 111. In the present embodiment as well, the license file LF is desirably encrypted.

Fifth Embodiment

To prevent illicit use of the substrate processing system, it may be considered to display part of the content of the license agreement for the control program concluded between the manufacturer of the substrate processing system and the user of the substrate processing system (purchaser (transferee) of the substrate processing system) (for example, the usage end date) for example on a display panel provided at the control computer at the substrate processing system. By displaying this, businesses involved with that illicitly used substrate processing system (for example, maintenance businesses of substrate processing systems) would be able to easily determine the fact of the illicit use. Further, by clearly displaying the above content, in the event of the dispute growing into a legal suit, the manufacturer of the substrate processing system would be able to prove that the use was a deliberate illegal act.

Figure 7A:
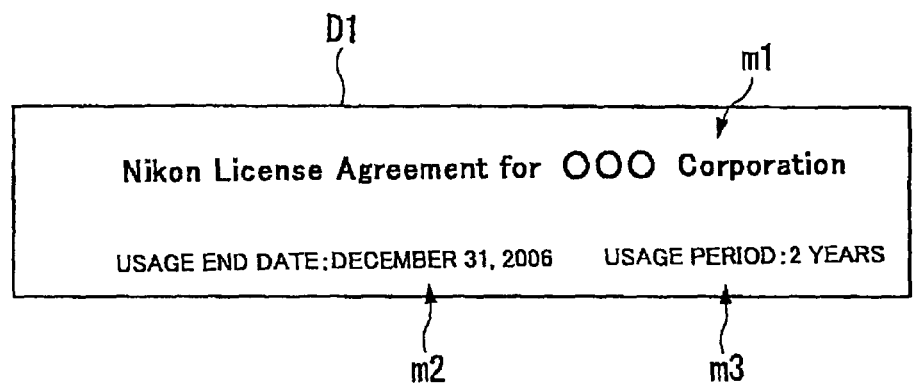
[FIG. 7a] A view showing an example of display of content of a license of a control program used in a substrate processing system according to a fifth embodiment of the present invention.
Figure 7B:
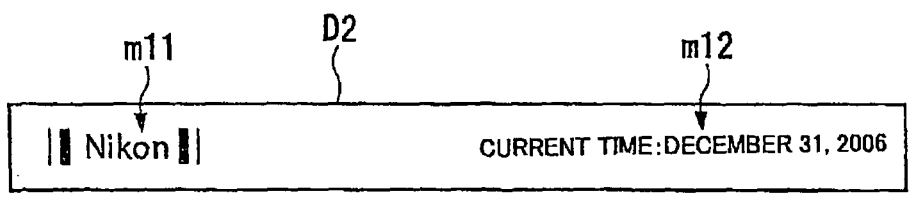
[FIG. 7b] A view showing an example of display of content of a license of a control program used in a substrate processing system according to a fifth embodiment of the present invention.
Figure 7C:
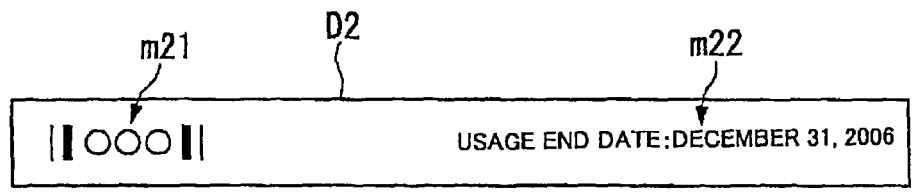
[FIG. 7c] A view showing an example of display of content of a license of a control program used in a substrate processing system according to a fifth embodiment of the present invention.

FIG. 7a to FIG. 7c are views showing examples of display of the content of the license for a control program used in a substrate processing system. In the example shown in FIG. 7a, the display box D1 displays a message m1 to the effect that the manufacturer of the substrate processing system, "Nikon", and a "ooo Company" have concluded a license and displays a message m2 showing the usage end date as the content of that agreement and a message m2 showing the usage period. In the example shown in FIG. 7a, from the content of the message m2 displayed in the display box D1, it can be seen at a glance that the usage end date of the control program for controlling the substrate processing system is set to "Dec. 31, 2006" and the usage period is set to "two years".

Further, in the examples shown in FIG. 7b and FIG. 7c, the display box D2 smaller in cross-sectional area than the display box D1 shown in FIG. 7a displays a first display showing a message m1 showing the manufacturer of the substrate processing system, that is, "Nikon", and the message m12 showing the current time (FIG. 7b) or a second display showing a message 21 showing the user of the substrate processing system, that is, the "ooo Company", and a message 22 showing part of the content of the agreement, that is, the usage end date (FIG. 7c). These first display and second display are alternately displayed at predetermined time intervals (for example, at 10 minute or 30 minute intervals). By this display, it is possible to display the manufacturer of the substrate processing system, the user of the substrate processing system, and content of the agreement even in a small display area.

The displays shown in FIG. 7a to FIG. 7c may also be applied to any of the above-mentioned first to fourth embodiments. At this time, it is possible to show the display shown in FIG. 7a to FIG. 7c on the display panel provided on the control computer at all times, display it at predetermined time intervals, or display it at any another timing. Further, the display on the display panel is not limited to the examples shown in FIG. 7a to FIG. 7c. Any display method may be used. For example, the content of the display box may be made just the manufacturer of the substrate processing system, just the user of the substrate processing system, and just the content of the agreement successively changed. Further, when the display panel also serves as an input panel for the operator to input instructions, it is desirably to display the information in a manner not obstructing operator instructions.

[Others]

The above explained embodiments were described to facilitate understanding of the present invention and were not described to limit the present invention. Therefore, the elements disclosed in the above embodiments include all design changes and equivalents falling under the technical scope of the present invention.

For example, in the above embodiments, when encrypting the license information L, a password W set by the manufacturer of the substrate processing system 11 was used, but to prevent this password PW from being deciphered and to facilitate management, it is desirable to use a password PW combining information unique to each substrate processing system 111, for example, the physical address of the network connection card 32a registered in the license file LF, the unique protect key ID for each protect key K1, the licensing date, or other information.

Further, in the above embodiments, the license file LF was encrypted and combined, but instead of these processing, it is also possible to use the above-mentioned superior tampering-preventing undecipherable function (for example, hash function) to generate an alphanumeric string (unique information) from the license information and register its hashed content (hash value) together with the license information (in a set with) in the license file LF. Whether the substrate processing system is being used as stipulated in the agreement and whether information has been tampered with are judged by comparing the hashed value registered in the license file LF with the hashed values of the device information DI and network information NI. Further, the decryption program P1, match confirmation program P2, and control program P3 provided in the control unit 101 shown in FIG. 3 may be provided as software or may be provided as hardware.

Further, in the above embodiments, the count results of a timer were used when confirming the usage period of the substrate processing system, but it is also possible to provide means for counting the number of shots in the exposure processing, the number of exposed wafers, the number of exposed lots, or other substrate processing amount showing the amount of processing of substrates and use the substrate processing amount to confirm the state of use of the substrate processing system. Further, to prevent tampering of these, these information may be stored in the memory M1 provided in the chamber unit CN shown in the first embodiment or the memory provided in the protect key K1 shown in the second embodiment or encrypted and then stored in the storage unit 102'.

Figure 8:
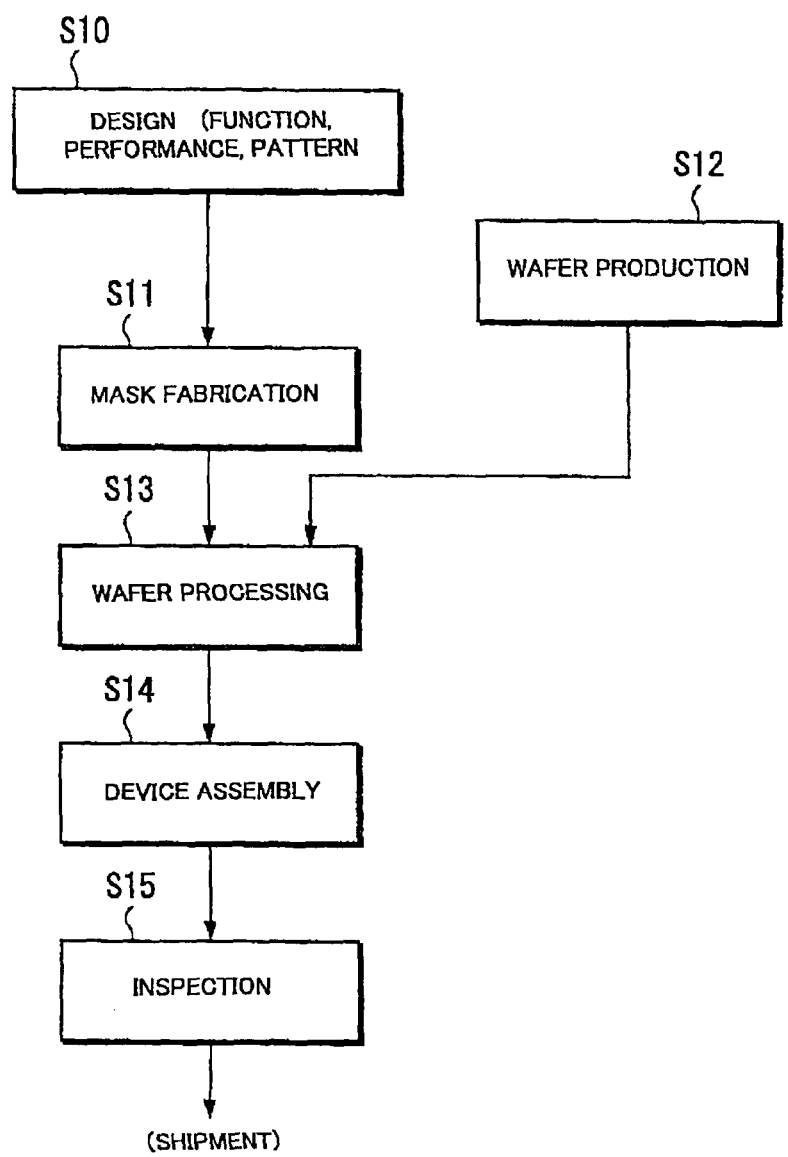
FIG. 8 A flowchart showing an example of the process of production of a device.

Next, the production of a device using the substrate processing system will be explained. FIG. B is a flowchart showing an example of the process of production of a device (IC or LSI or other semiconductor chip, liquid crystal panel, CCD, thin film magnetic head, micromachine, etc.) As shown in FIG. 8, first, at step S10 (design step), the functions of the device are designed (for example, semiconductor device circuit design etc.) and patterns for realizing those functions are designed. After this, at step S11 (mask fabrication step), a mask formed with the designed circuit patterns is fabricated. On the other hand, at step S12 (wafer production step), silicon or another material is used to produce a wafer.

Next, at step S13 (wafer process step), exposure processing using the mask and wafer prepared at step S10 to step S12 to transfer the patterns formed on the mask to the wafer by lithography, development processing for developing the wafer after the exposure processing, substrate processing for etching the wafer finished being developed, etc. are performed to form the actual circuits on the wafer. Next, at step S14 (assembly step), the wafer processed at step S13 is used to form chips. This step S14 includes assembly processes (dicing and bonding) and packaging processes (chip sealing) etc. Finally, at step S15 (inspection step), the device fabricated at step S14 is inspected by an operation confirmation test, durability test, etc. After these steps, the device is completed and then shipped out.

Further, in the embodiment, the exposure apparatus 30 used exposure light IL comprised of laser light emitted from an ArF excimer laser etc., but a laser plasma light source or soft X-ray region, for example, wavelength 13.4 nm, or 11.5 nm EUV (Extreme Ultra Violet) light generated from a SOR may also be used. Further, an electron beam or ion beam or other charged particle beam may be used. Further, the projection optical system PL may use any of a reflection optical system, refraction optical system, or reflection and refraction optical system.

Further, it is also possible to amplify the infrared or visible band single wavelength laser emitted from aDFB semiconductor laser or fiber laser by for example an erbium (or erbium and yttrium) doped fiber amplifier, use a nonlinear optical crystal to convert the wavelength to ultraviolet light, and use the harmonic.

Further, the substrate processing system 11, 111 is not limited to an exposure apparatus for transferring device patterns used for producing semiconductor devices on to a wafer W and may also be provided with an exposure apparatus for transferring to a glass plate the device patterns used for production of a display including liquid crystal display elements, an exposure apparatus for transferring device patterns used for production of thin film magnetic heads to ceramic exposure light, an exposure apparatus used for production of imaging devices (CCDs etc.), micromachines, and DNA chips, etc.

This disclosure relates to the matter included in Japanese Patent Application No. 2004-235216 filed on Aug. 12, 2004 and clearly incorporates by reference all of that disclosure here.

The invention claimed is:

1. An exposure system for exposing a substrate comprising:
   an exposure apparatus;
   a chamber that surrounds said exposure apparatus;
   a chamber controller, which controls operation of said chamber, including a timer that counts time and a memory, access to the chamber controller being protected by requiring a password;

a control computer including (1) a processor and (2) a memory storing a computer executable program that, when executed by the processor, causes the processor to perform the steps of:
    storing license information in a license information storing device, the license information including a shutdown time period of said exposure system as usage terms of said exposure system for a specific user;
    detecting end of operation of the exposure system;
    in response to the detection of end of operation of the exposure system, writing a current time counted by said timer to said memory provided in said chamber controller as a previous time;
    detecting initiation of operation of the exposure system;
    in response to the detection of initiation of operation of the exposure system, reading out said previous time written into said memory in the chamber controller;
    determining an elapsed time by retrieving current time from said timer, retrieving the previous time from said memory, and comparing the retrieved current time to the previous time, wherein the elapsed time indicates a time period during which said exposure system has been shut down;
    retrieving said shutdown period from said license information and determining whether said elapsed time exceeds said shutdown period from said license information;
    confirming a state of use of said exposure system based on the determination whether said elapsed time exceeds said shutdown period from said license information; and
    disabling operation of the exposure system based on the determination whether said elapsed time exceeds said shutdown period from said license information.

2. The substrate processing system as set forth in claim 1, wherein
    said license information further includes at least one of (1) a usage end date and (2) a predetermined usage period of said substrate processing system, and a usage start date of said substrate processing system, and
    said control computer is configured to confirm the state of use of said substrate processing system based on at least one of (1) whether a usage period from said usage start date of said substrate processing system has exceeded said usage end date and (2) whether a cumulative usage period from said usage start date of said substrate processing system has exceeded said predetermined usage period.

3. The substrate processing system as set forth in claim 2, wherein
    said license information includes at least one of device information relating to said substrate processing system and network information relating to a network to which said substrate processing system is connected, and
    said control computer is configured to confirm the state of use of said substrate processing system based on a comparison of at least one of device information and network information obtained from said substrate processing system with at least one of the device information and the network information contained in said license information.

4. The substrate processing system as set forth in claim 1, wherein said license information is stored in said license information storing device as a set with unique information generated using an indecipherable function based on said license information or is stored encrypted in said license information storing device using an encryption method.

5. The substrate processing system as set forth in claim 4, wherein said license information storing device is configured to store said license information as the set with unique information generated using the indecipherable function based on said license information, and
    said indecipherable function is a hash function.

6. The substrate processing system as set forth in claim 4, wherein said license information storing device is configured to store said license information encrypted using an encryption method, and
    said encryption method includes at least one of a common key system and a public key system.

7. The substrate processing system as set forth in claim 1, further comprising
    a key device that is configured to be attachable/detachable to the control computer of said substrate processing system for starting up said substrate processing system, wherein
    said exposure apparatus is provided with a plurality of control units for controlling the operations of parts of the substrate processing system, and
    at least one of said license information storing device and said timer is connected to least at one of the plurality of control units.

8. The substrate processing system as set forth in claim 7, wherein the time information of said timer is stored in a time information storing device provided in at least one of (1) said plurality of control units, (2) said key device, and (3) said control computer.

9. The substrate processing system as set forth in claim 8, wherein the time information storing device is configured to store the time information encrypted.

10. The substrate processing system as set forth in claim 8, further including a tampering judging device which judges existence of tampering of time information stored in said time information storing device.

11. The substrate processing system as set forth in claim 10, wherein said tampering judging device judges the existence of said tampering based on whether (1) a confirmed time shown by a sum of the usage start date of said substrate processing system included in said license information and a number of days elapsed from said start of use matches with a time indicated by the time information of said timer or whether (2) said confirmed time is before the time indicated by time information of said timer.

12. The substrate processing system as set forth in claim 11, wherein when said confirmed time is before the time indicated by the time information of said timer, said tampering judging device corrects said confirmed time to the time indicated by said time information.

13. The substrate processing system as set forth in claim 10, wherein
    said system stores time information of said timer in said time information storing device periodically at predetermined timings, and
    said tampering judging device judges the existence of said tampering based on whether time information stored in said time information storing device is before current time information of said timer.

14. The substrate processing system as set forth in claim 10, wherein said tampering judging device judges the existence of said tampering based on whether a time of preparation of automatically prepared specific information is before current time information of said timer.

15. The substrate processing system as set forth in claim 1, further comprising
- a position detecting device which receives a signal emitted from a global positioning system satellite and detects position information indicating a position of said substrate processing system, wherein
- said license information includes a distance of movement of said substrate processing system, and
- said control computer confirms the state of use of said substrate processing system based on said movement distance stored in said storing device and detection results of said position detecting device.

16. The substrate processing system as set forth in claim 1, further including a shutdown device which shuts down the operation of said substrate processing system until a predetermined action is taken when the state of use of said substrate processing system confirmed by said control computer contravenes predetermined usage terms.

17. The substrate processing system as set forth in claim 16, wherein said predetermined action is an action of storing updated license information with newly determined usage terms of said substrate processing system in said storing device.

18. The substrate processing system as set forth in claim 1, further including a display device which displays (1) a manufacturer of said substrate processing system, (2) information for identifying a user given said license information, and (3) at least part of content of an agreement concluded with said user when imparting said license information.

19. A method of confirmation of state of use which confirms the state of use of an exposure system having an exposure apparatus that exposes a substrate, a chamber that surrounds said exposure apparatus, and a chamber controller, which controls operation of said chamber, including a timer that counts time and a memory, access to the chamber controller being protected by requiring a password, the method being performed by a control computer of the exposure system and comprising the steps of:
- preparing a license file by the control computer;
- storing license information in the license file by the control computer, the license information including a shutdown time period of said exposure system as usage terms of said exposure system for a specific user;
- detecting, by the control computer, end of operation of the exposure system;
- in response to the detection of end of operation of the exposure system, acquiring time information from said timer in said chamber controller by the control computer and writing the acquired time information to said memory provided in said chamber controller as a previous time;
- detecting, by the control computer, initiation of operation of the exposure system;
- in response to the detection of initiation of operation of the exposure system, reading out, by the control computer, said previous time written into said memory in the chamber controller;
- determining, by the control computer, an elapsed time by retrieving current time from said timer, retrieving the previous time from said memory, and comparing the retrieved current time to the previous time, wherein the elapsed time indicates a time period during which said exposure system has been shut down;
- judging, by the control computer, whether said time period during which said exposure system has been shut down exceeds said shutdown time period included in said license information stored in said license file by retrieving said shutdown period from said license information and determining whether said elapsed time exceeds said shutdown period from said license information; and
- disabling, by the control computer, operation of the exposure system based on the determination whether said elapsed time exceeds said shutdown period from said license information.

20. A method of confirmation of state of use as set forth in claim 19 further including a step of stopping the operation of said substrate processing system until a predetermined action has been taken when the state of use of said substrate processing system contravenes said predetermined usage terms.

21. The method of confirmation of state of use as set forth in claim 19 further including a step of displaying on a display device (1) a manufacturer of said substrate processing system, (2) information for identifying a user given said license information, and (3) at least part of content of an agreement concluded with said user when imparting said license information.

* * * * *